United States Patent [19]

Haller et al.

[11] Patent Number: 4,878,859
[45] Date of Patent: Nov. 7, 1989

[54] SUPPORT ASSEMBLY FOR AN ELECTRICAL TERMINAL HOUSING

[75] Inventors: Bernd Haller, Detmold; Ernst Herkner, Lemgo; Peter Murray; Volker Riesenberg, both of Detmold; Michael Schnatwinkel, Herford; Rainer Schulze, Detmold; Georg Wagner, Oerlinghausen; Manfred Wilmes, Detmold, all of Fed. Rep. of Germany

[73] Assignee: C. A. Weidmuller GmbH, Fed. Rep. of Germany

[21] Appl. No.: 285,064

[22] Filed: Dec. 16, 1988

[30] Foreign Application Priority Data

Jan. 30, 1988 [EP] European Pat. Off. ......... 88101365.0

[51] Int. Cl.⁴ .............................................. H01R 9/26
[52] U.S. Cl. .................................................... 439/716
[58] Field of Search ................. 248/214, 223; 292/74; 439/94, 715, 716, 717

[56] References Cited

U.S. PATENT DOCUMENTS 3,583,736 6/1971 Willimzik ........................ 292/74 X
4,018,413 4/1977 Bauer .............................. 439/716 X

FOREIGN PATENT DOCUMENTS 0174094 2/1953 Fed. Rep. of Germany ...... 439/717
1177710 9/1964 Fed. Rep. of Germany ...... 439/717
7709171 10/1979 Fed. Rep. of Germany .
3145444 5/1983 Fed. Rep. of Germany ...... 439/716

Primary Examiner—Neil Abrams
Assistant Examiner—Khiem Nguyen
Attorney, Agent, or Firm—Laubscher, Presta & Laubscher

[57] ABSTRACT

An assembly for supporting an electrical terminal housing on a carrier rail is provided, including a pair of slide members connected with a guide portion of the housing for sliding movement between latched and released positions. The thickness of the guide is slightly greater than the thickness of the slide members to define a gap therebetween. Each of the slide members includes a lower hook portion engaging a leg of the carrier rail when the slide members are in the latched position to connect the terminal housing with the rail, and a spring is connected with the slide members for normally biasing the hook portions toward the latched position. A first abutment is connected with the housing and a second abutment is connected with the slide members, the second abutment being normally vertically offset from the first abutment by a distance corrsponding with the thickness of the gap. When the housing is lifted with respect to the slide members, the gap is closed and the first and second abutments are arranged opposite each other to prevent lateral movement of the slide members toward the released positions, thereby to prevent unintentional removal of the terminal housing from the carrier rail.

12 Claims, 3 Drawing Sheets

SUPPORT ASSEMBLY FOR AN ELECTRICAL TERMINAL HOUSING

BACKGROUND OF THE INVENTION

The present invention relates to a support assembly for a bank or line of electrical terminals arranged in a housing. The support assembly affords perpendicular placement and removal of the terminal housing from a carrier rail while preventing unintentional removal or diconnection of the housing from the rail when environmental and other stressful forces, such as connecting an electrical contact or plug with a terminal, are applied to the housing.

SUMMARY OF THE INVENTION

In accordance with the invention, a terminal housing for a bank or line of electrical terminals is provided. The housing includes a guide portion, and a pair of slide members is connected with the housing guide for sliding movement between latched and released positions for connecting the housing with a carrier rail. The thickness of the housing guide portion is slightly greater than the thickness of the slide members to define a gap between the slide members and the housing guide portion. Each of the slide members includes a lower hook portion engaging a leg of the carrier rail when the slide members are in the latched position to connect the terminal housing with the rail. A spring assembly is connected with the slide members for normally biasing the member hook portions toward the latched positions, respectively. The invention also includes apparatus for preventing unintentional movement of the slide members to the released positions. More particularly, first and second abutments are connected with the housing and the slide members, respectively. The second abutment is normally vertically offset from the first abutment by the thickness of the gap so that when the housing is lifted with respect to the slide members, the gap is closed and the first and second abutments are arranged opposite each other to prevent lateral movement of the slide members toward the released positions.

According to a further object of the invention, the slide members are coupled for movement in opposite directions relative to each other. The lower inner surfaces of the hook portion of each slide member are tapered outwardly toward the bottom edge thereof, whereby the terminal housing may be placed on the carrier rail in a perpendicular fashion, with the hook portions of the slide members being deflected toward the released position upon engagement with the carrier legs and then snapping back to the latched position as the hook portions pass over the respective legs of the carrier rail to latch the terminal housing thereto.

In one embodiment, the slide members are coupled together via an integral elastic rotation joint including a central rotating portion and a pair of elasticaly deformable segments connected between the slide members and the rotating portion, respectively.

In another embodiment, the slide members comprise superimposed members and the hook portions are angled downwardly to define clips for engaging the legs of the carrier rail. The slide members each include an upper reversely folded portion, and a spring is arranged between the reversely folded portions to bias the superimposed slide members toward the latched positions.

BRIEF DESCRIPTION OF THE FIGURES

Other objects and advantages of the present invention will become apparent from a study of the following specification when viewed in the light of the accompanying drawing, in which.

DETAILED DESCRIPTION

The present invention relates to a support assembly for releasably connecting a terminal housing with a carrier rail. The housing preferably includes a plurality of electrical terminals arranged in line or in a terminal bank. Electrical connectors are typically connected with the terminals of the housing by a plug or screw connection.

Figure 1:
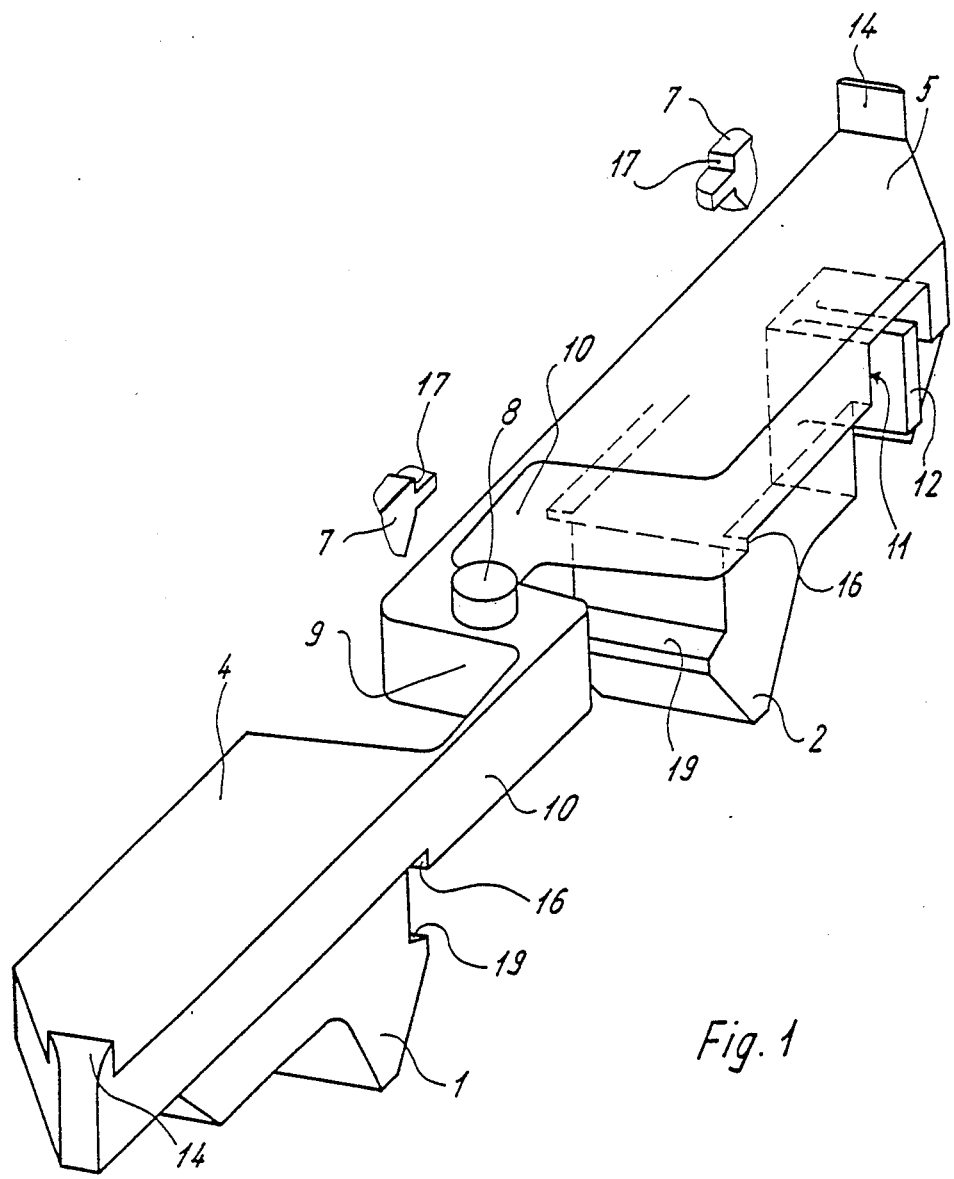
FIG. 1 is a perspective view of the terminal housing support assembly according to a first embodiment of the invention.
Figure 2:
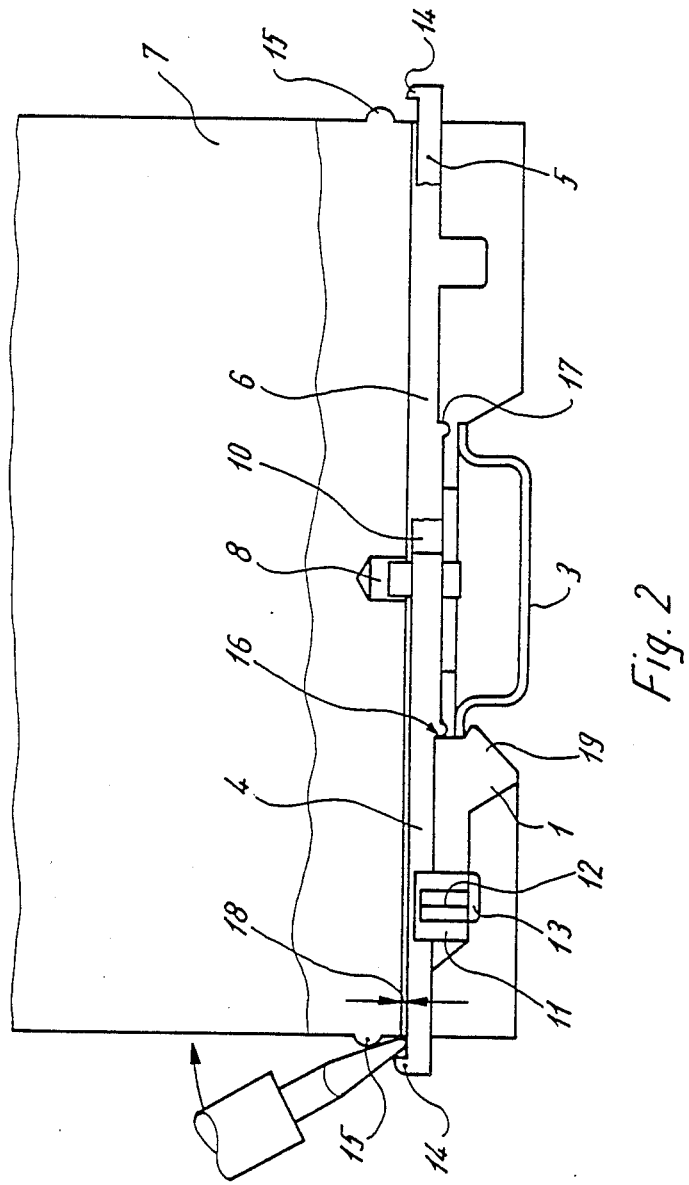
FIG. 2 is a partially cut away side view illustrating the support assembly for connecting the terminal housing with a carrier rail.

Referring first to the embodiment of FIGS. 1 and 2, the terminal housing 7 includes a guide portion or channel 6 within which the support assembly is arranged.

The support assembly includes a pair of slide members 4, 5 connected within the housing guide for sliding movement between latched and released positions. As shown in FIG. 2, the thickness of the housing guide is slightly greater than the thickness of the slide members 4, 5 to define a gap or clearance 18 between the slide members and the housing guide portion. Each slide member includes a lower hook portion. That is, the slide member 4 includes a hook portion 1 which is adapted to engage one leg or extremity of the carrier rail 3 with which the terminal housing is releasably connected. Similarly, the slide member 5 includes a lower hook portion 2 for engaging the other leg or extremity of the carrier rail 3. The hook portions of each slide member engage the carrier rail leg portions when the assembly is in the latched position. Conversely, when the assembly is in the released position, the slide pieces are displaced laterally outwardly within the housing guide portion to disengage the hook portions from the carrier rail extremities.

As will be developed below, the slide members 4 and 5 are normally biased by a spring assembly toward the latched position wherein the hook portions engage the extremities of the carrier rail. Moreover, the slide members are interconnected for movement in opposite directions as they are displaced between the latched and released position.

In the embodiment of FIG. 1, an elastic rotation joint is provided between the slide members. More particularly, this rotation joint includes upper and lower bearing pins 8 which are arranged in corresponding recesses in the housing as shown in FIG. 2. The bearing pins 8 are arranged in the middle of a central rotating portion 9 and a pair of elastically deformable segments 10 are provided to connect each slide member with the rotation bearing joint. The slide members and rotational bearing joints are preferably integrally formed of synthetic plastic material.

An integral spring member is preferably formed with each slide member of the support assembly. That is, each slide member contains a lower chamber 11 within which a flexible flap 12 integrally connected with the slide members is arranged. In the embodiment of FIG. 1, the chamber and the spring-like flexible flap 12 are shown arranged beneath the slide member 5. Although a single spring assembly is sufficient, spring flaps are preferably arranged in chambers beneath both of the slide members. In the wall of the housing 7 which borders on the area of the support assembly containing the chambers 11, there is provided an aligned recess 13 as shown in FIG. 2 into which the ends of the spring flap 12 extend. The outer edge of the housing recess thus forms an abutment for the elastic bending of the spring flap when the corresponding slide pieces move toward the released position. In the embodiment of FIGS. 1 and 2, the released position is that defined when the slide members are arranged outwardly away from the carrier rail. Thus, as the slides are displaced toward the released position, the spring flaps 12 engage a wall of the housing and operate to bias the slide members inwardly toward the latched position.

The integrally formed support assembly shown in FIG. 1 comprising the opposed slide members 4 and 5 interconnected via the rotation bearing joint also includes integral activating bars 14 at the free outer ends thereof as shown in FIG. 1. The housing assembly preferably includes protuberances 15 on the front and rear walls thereof as shown in FIG. 2. The free ends of the slide members extend outwardly of the housing with the activating bars 14 being arranged adjacent the protuberances 15 on the housing walls. With reference to FIG. 2, an activating tool such as a screwdriver may be wedged between the activating bar 14 of the corresponding slide member and the protuberance 15 on the housing. When the screwdriver is tilted toward the housing, the activating bar and corresponding slide members are pried away from the carrier rail to the released position, whereby the hook portions 1, 2 of the slide members 4, 5 are simultaneously disengaged from the legs of the carrier rail. The terminal housing may thus be lifted away from the carrier rail in a direction perpendicular to the direction of the extension of the carrier rail.

The terminal housing is easily connected with the terminal rail by pressing the terminal housing against the rail in a direction perpendicular to the rail, without any swinging motion being necessary to latch the support assembly to the rail. More particularly, the hook portions 1 and 2 of the slide members 4 and 5 have corresponding inclined lower surfaces 19. As the housing and support assembly is pressed against the carrier rail, the extremities of the rail ride up on the inclined surfaces 19 of the hook portions to displace the hook portions and thus the slide members toward the released position. Simultaneously, the spring flaps 12 are deflected and come to rest against the outer wall of the housing recesses 13 until the hook portions overlap the ends of the extremities of the carrier rail. Owing to the elastic rotation joint between the slide members, the slide members move synchronously in opposite directions back toward the latched position under the influence of the spring flaps 12 to securely connect the housing with the carrier rail. In order to disengage the housing from the rail, it suffices to force either the slide member 4 or the slide member 5 against the biasing force of the spring bars in the released position, i.e. toward the outer edges of the housing as shown in FIG. 2, by wedging the screwdriver between the activiting bar 14 and the protuberance 15 of the housing. Owing to the elastic rotation joint, there is a synchronous mutually counter running opening movement of the slide members 4 and 5 so that once the hook portions 1 and 2 are free of the extremities of the carrying rail, the terminal housing may be perpendicularly lifted away from the carrier rail without any type of swinging or rotational movement.

Because the engagement of the hook portions of the sliding members on the extremities of the carrier rail is elastically spring suspended, it is necessary to insure that external stressing forces which act upon the engaged terminal housing and which might lead to an unintentional disengagement of the terminal from the rail are reduced or eliminated. Accordingly, the support assembly is provided with an apparatus to prevent the unintentional movement of the slide members to the release positions.

More particularly, first abutments 17 are provided on the housing as shown in FIGS. 1 and 2, with second abutments 16 being provided on the slide members adjacent the hook portions of the slide members. The second abutments 16 are normally vertically offset from the first abutments 17 on the terminal housing by the thickness of the gap or clearance 18 between the slide members and the housing guide. Thus, when the housing is lifted with respect to the slide members, the gap is closed and the first and second abutments are arranged opposite each other. In this position, lateral movement of the slide members toward the released positions is prevented by the engaging abutments as shown, for example, in FIG. 2. Thus, the slide members cannot be displaced toward the released position a sufficient distance to enable the hook portions to be released from the extremities of the carrier rail. This prevents unintentional removal or disconnection of the terminal housing from the carrier rail such as, for example, when forces due to a plugging connection are applied to the terminal housing without intending to disconnect the housing from the rail.

Because the edge 19 of the hook portion is inclined slightly, a very limited displacement of the slide members toward the released position is afforded when a lifting force is applied to the terminal housing to close the gap 18. However, the degree of separation of the slide members is limited to an extent to prevent the hook portions from becoming disengaged from the edges of the carrier rail.

On the other hand, by using an auxiliary tool, such as a screwdriver, displacement forces may be applied to the slide members 4 and 5 to facilitate movement of the slide members toward the released position, with the abutment means remaining in their offset relation, whereby the slide members are allowed to move apart a sufficient distance to disengage the hook portions from the extremities of the carrier rail.

Figure 3:
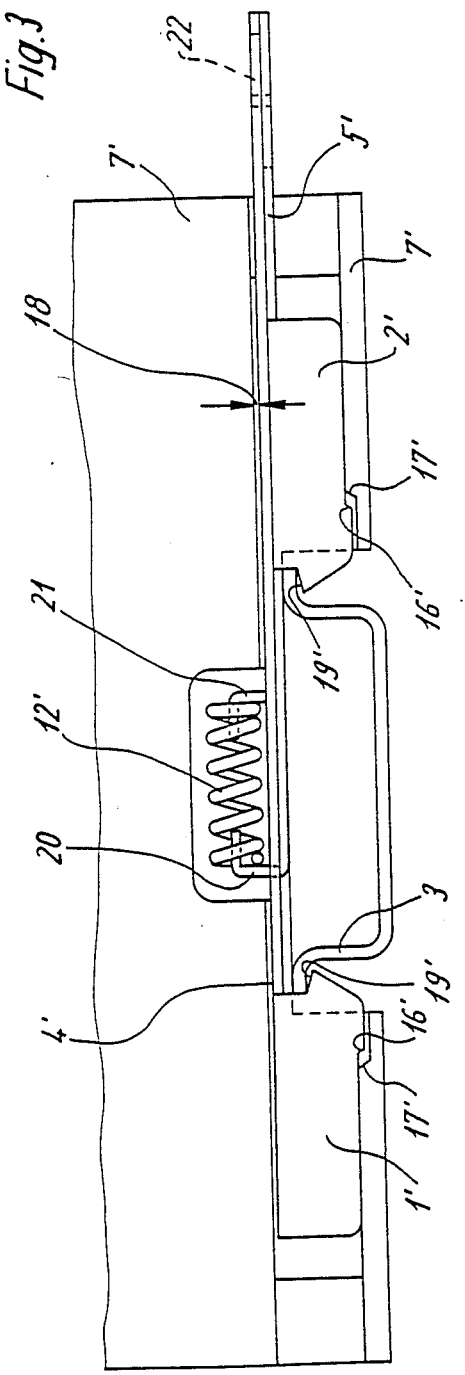
FIG. 3 is a side view of a second embodiment of the support assembly partially cut away to illustrate the support assembly for connecting the terminal housing with a carrier rail.
Figure 4:
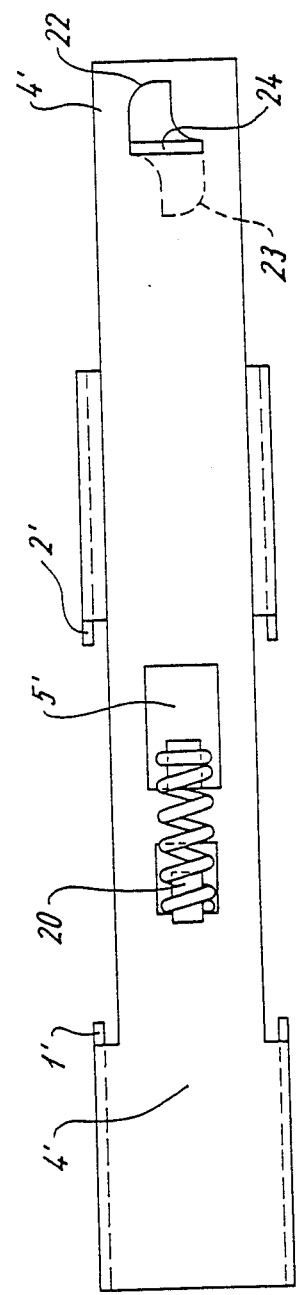
FIG. 4 is a top plan view of the support assembly of the embodiment of FIG. 3.

Referring now to FIGS. 3 and 4, a second embodiment of the support assembly will be described. In this embodiment, the slide pieces 4', 5' comprise separate superimposed members which slide relative to one another within a guide channel of the housing 7'. The slide members are each formed of a metallic material and include metallic hook portions in the form of clips which rest against each other in a mutually moveable fashion and which are guided out of the housing 7' on one side as shown in FIG. 3. At the internal side of the slide piece 5' there is a reversely folded portion 20 which extends through an opening in the top slide member 4' as shown in FIG. 4. The slide member 4' also includes a reversely folded portion 21. A spring 12' is arranged between and connected with the reversely folded portions 20, 21 of the slide members 5', 4' to normally bias the slide members toward the latched position. Thus, in order to connect the housing 7' with the carrier rail 3, the support assembly is perpendicularly placed on the rail, and the hook portion clips are slightly displaced outwardly as the inclined surfaces thereof run up against the edge or extremity of the carrier rail until the hook portions overlap the carrier rail extremities and snap into the latched position shown in FIG. 3.

A blocking assembly to prevent unintentional removal of the housing support assembly from the carrier rail is also provided. More particularly, an abutment 16' is provided on each of the lower hook portions of the slide members, and a corresponding abutment 17' is provided on the lower surface of the terminal housing, the abutments normally being offset by a distance corresponding with the thickness of the gap 18 arranged between the slide members and the housing guide. When the housing is unintentionally vertically displaced away from the carrier rail, the gap is closed and the abutments between the housing and the slide member hook portions are arranged opposite each other for engagement to prevent displacement of the slide members toward the fully released position.

As shown in FIG. 4, each slide member includes a curved opening in the portion thereof which extends exteriorly of the housing. More particularly, the slide member 4' contains an opening 22 and the slide member 5' contains an opening 23, the openings overlapping in a region to define a slot 24 therebetween. An actuating tool such as a screwdriver is inserted into the slot and rotated to displace the slide members relative to one another. As in the embodiment in FIGS. 1 and 2, the slide members are arranged for movement in opposite directions relative to each other. Thus, when an actuating tool is arranged in the slot 24 and rotated, the slide members are displaced outwardly in opposite directions toward the released position.

The perpendicular placement of a terminal housing upon the carrier rail is accomplished in such a manner that without any tilting movement, the placement force of the terminal housing displaces the slide members toward the released position against the biasing force of the spring 12' owing to the inclined lower surfaces of the hook portions engaging the ends of the carrier rail. Once the inclined surfaces 19' of the clip hook portions overlap the ends of the carrier rail, the slide members snap back toward the latched position under the influence of the spring 12' to connect the terminal housing with the carrier rail. In order to open the slide members deliberately, the actuating tool is placed in the slot 24 and rotated to displace the slide members outwardly from each other and thereby disengage the hook portions clips from the edges of the carrier rail. Unwanted or unintentional disengagement of the terminal housing from the carrier rail is prevented owing to the arrangement of the abutments 16', 17'. Since these abutment members are brought into a mutual collision position, displacement of the slides toward the released position is prevented. Where the slide members are deliberately opened upon operation of the actuating tool, the abutments 16' and 17' are offset so as not to prevent movement of the slide member between the open and released positions.

With the present invention, there is no longer any need for a fixed bearing in the assembly support area. The abutment stops can be arranged so that they do not engage the carrier rail legs, whereby the terminal housing and support assembly can be lifted off perpendicularly away from the carrier rail. In spite of the bilateral elastic bearing, unintentional disengagement from the carrier rail in case of external stresses can be avoided. When an unintentional lifting of the terminal housing away from the carrier rail occurs, the gap is closed and the abutments 16, 17 engage each other to immediately prevent any further movement of the slide members toward the released position. On the other hand, when the slide pieces are activated toward the released position by an operating tool, te abutments can slide pass each other.

Removal of the terminal housing perpendicularly from the carrier rail which is possible without swinging movement is advantageous not only with regard to the space required on a control panel or switch board, but also facilitates the use of relatively long support areas in combination with particularly low built carrier rail types. In other words, the present invention affords a combination not possible in the prior art because the required swing or tilting movement of the prior art is no longer necessary to connect or remove the terminal relative to the carrier rail.

Another feature of the invention which is essential in terms of practical handling resides in the fact that the two slide members are movement coupled in opposite directions. In this manner, it is possible to move both slide pieces toward the released position by acting only upon one side of the terminal. Thus, it is possible to have one hand free for perpendicular removal of the terminal while the other hand is available to operate the tool necessary to separate the slide members toward the released position.

While in accordance with the provisions of the patent statute the preferred forms and embodiments of the invention have been illustrated and described, it will be apparent to those of ordinary skill in the art that various changes and modifications may be made without deviating from the inventive concepts set forth above.

WHAT IS CLAIMED IS:

1. An assembly for supporting an electrical terminal bank on a carrier rail, comprising
   (a) a terminal housing including a guide;
   (b) a pair of slide members connected with said housing guide for sliding movement between latched and released positions, the thickness of said housing guide being slightly greater than the thickness of said slide members to define a gap therebetween;
   (c) each of said slide members including a lower hook portion engaging a leg of the carrier rail when said slide members are in the latched position for connecting said terminal housing with the rail;
   (d) spring means connected with said slide members for normally biasing said member hook portions toward the latched positions, respectively; and
   (e) means for preventing unintentional movement of said slide members to said released positions including first and second abutment means connected with said housing and said slide members, respectively, said second abutment means being normally vertically offset from said first abutment means by the thickness of said gap, whereby when said housing is lifted with respect to said slide members, said gap is closed and said first and second abutment means are arranged opposite each other to prevent lateral movement of said slide members toward the released positions.

2. Apparatus as defined in claim 1, wherein said slide members are coupled for movement in opposite directions relative to each other.

3. Apparatus as defined in claim 2, wherein the lower inner surfaces of said hook portions are tapered outwardly toward the bottom edge thereof.

4. Apparatus as defined in claim 2, wherein said slide members are coupled via an integral elastic rotation joint including a central rotating portion and a pair of elastically deformable segments connected between said slide members and said rotating portion, respectively.

5. Apparatus as defined in claim 4, wherein said slide members each contain a lower chamber within which said spring means are arranged, said spring means comprising a flexible flap integrally formed with said slide members, said housing containing a pair of recesses aligned with said slide portion recessses, respectively, said housing recesses each being defined by an outer wall which comprises an abutment for the elastic deformation of said flaps.

6. Apparatus as defined in claim 1, wherein said housing includes front and rear walls each containing a protuberance, and wherein said slide members each contain a free end extending outwardly from said housing front and rear walls adjacent said protuberances, said slide member free ends each including an activation bar adjacent said housing protuberance, whereby a tool may be arranged between said housing protuberance and said activation bar to pry said bar and said slide member outwardly from said housing to said released position to remove said housing from the rail.

7. Apparatus as defined in claim 1, wherein said second abutment means comprise shoulders formed on the bottom of said slide pieces adjacent the interior front surfaces of said hook portions.

8. Apparatus as defined in claim 4, wherein said slide members, said hook portions, said rotation joint and said segments are formed of synthetic plastic material.

9. Apparatus as defined in claim 1, wherein said slide members comprise superimposed members and wherein said hook portions are angled downwardly to define clips for engaging the legs of the carrier rail, said slide members each including upper reversely folded portions, said reversely folded portion of said lower slide member passing through an opening in said upper slide member, said spring means comprising a spring connected with and arranged between said reversely folded portions.

10. Apparatus as defined in claim 9, wherein said slide member includes hook and reversely folded portions integrally formed of metal with said member.

11. Apparatus as defined in claim 9, wherein said slide members extend laterally from said housing, said slide members containing aligned curved openings defining a slot for receiving an actuating tool for displacing said slide members against the force of said spring toward the released position.

12. Apparatus as defined in claim 9, wherein said second abutment means comprise offset portions on the underside of said clip hook portions.

* * * * *